US012581529B2

(12) United States Patent
Turtinen et al.

(10) Patent No.: US 12,581,529 B2
(45) Date of Patent: Mar. 17, 2026

(54) CONTENTION RESOLUTION IN RANDOM ACCESS PROCEDURE

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 421 days.

(21) Appl. No.: 17/770,528

(22) PCT Filed: Nov. 7, 2019

(86) PCT No.: PCT/CN2019/116412
§ 371 (c)(1),
(2) Date: Apr. 20, 2022

(87) PCT Pub. No.: WO2021/087918
PCT Pub. Date: May 14, 2021

(65) Prior Publication Data
US 2022/0394758 A1      Dec. 8, 2022

(51) Int. Cl.
*H04W 74/00* (2009.01)
*H04W 74/0833* (2024.01)
(Continued)

(52) U.S. Cl.
CPC ..... *H04W 74/002* (2013.01); *H04W 74/0833* (2013.01); *H04W 74/0836* (2024.01); *H04W 74/0838* (2024.01)

(58) Field of Classification Search
CPC .................................................. H04W 74/002
See application file for complete search history.

(56) References Cited

U.S. PATENT DOCUMENTS 11,265,779 B2 * 3/2022 Han .................... H04W 74/004
11,792,858 B2 * 10/2023 Zhang .............. H04W 74/0833
370/329
(Continued)

FOREIGN PATENT DOCUMENTS

CN      109842954 A    6/2019
WO    2018/129394 A1    7/2018
(Continued)

OTHER PUBLICATIONS

"3rd Generation Partnership Project; Technical Specification Group Radio Access Network; NR; Medium Access Control (MAC) protocol specification (Release 15)", 3GPP TS 38.321, V15.7.0, Sep. 2019, pp. 1-78.
(Continued)

*Primary Examiner* — Guang W Li
(74) *Attorney, Agent, or Firm* — SQUIRE PATTON BOGGS (US) LLP

(57) ABSTRACT

Embodiments of the present disclosure relate to contention resolution in random access procedure. A first device transmits to a second device a random access request comprising a first identification of the first device. The first device receives a response to the random access request from the second device. The response comprises a second identification from the second device for the first device and control information indicating a resource for communication between the first device and the second device. The first device compares the second identification with the first identification to determine data to be transmitted by using the indicated resource.

18 Claims, 7 Drawing Sheets

600

RECEIVE, FROM A FIRST DEVICE, A RANDOM ACCESS REQUEST COMPRISING A FIRST IDENTIFICATION OF THE FIRST DEVICE ⸺ 610

DETERMINE A SECOND IDENTIFICATION FOR THE FIRST DEVICE BASED ON THE FIRST IDENTIFICATION ⸺ 620

TRANSMIT TO THE FIRST DEVICE A RESPONSE TO THE RANDOM ACCESS REQUEST, THE RESPONSE COMPRISING THE SECOND IDENTIFICATION AND CONTROL INFORMATION ⸺ 630

(51) Int. Cl.
　　*H04W 74/0836* 　　(2024.01)
　　*H04W 74/0838* 　　(2024.01)

(56) References Cited

U.S. PATENT DOCUMENTS

| | | | |
|---|---|---|---|
| 2015/0043547 | A1 | 2/2015 | Pelletier et al. |
| 2018/0020382 | A1* | 1/2018 | Kim ...................... H04L 1/1819 |
| 2018/0103465 | A1 | 4/2018 | Agiwal et al. |
| 2018/0205516 | A1* | 7/2018 | Jung ................ H04W 74/0836 |
| 2018/0279186 | A1 | 9/2018 | Park et al. |
| 2018/0279375 | A1 | 9/2018 | Jeon et al. |
| 2018/0279376 | A1 | 9/2018 | Dinan et al. |
| 2019/0230715 | A1* | 7/2019 | Christoffersson ..... H04W 72/23 |
| 2019/0335515 | A1 | 10/2019 | Chen et al. |
| 2019/0350004 | A1* | 11/2019 | Zhao .................... H04W 76/11 |
| 2020/0107372 | A1* | 4/2020 | Agiwal ................ H04W 80/02 |
| 2020/0196264 | A1* | 6/2020 | Shih ...................... H04W 76/30 |
| 2020/0260500 | A1* | 8/2020 | Agiwal ............ H04W 28/0278 |
| 2020/0351801 | A1* | 11/2020 | Jeon ...................... H04W 52/48 |
| 2021/0105824 | A1* | 4/2021 | Lei ........................ H04L 1/1854 |
| 2021/0105828 | A1* | 4/2021 | Agiwal ................ H04L 5/0051 |
| 2021/0120581 | A1* | 4/2021 | Kim .................. H04W 74/0833 |
| 2021/0212115 | A1* | 7/2021 | Dong .................. H04W 74/085 |
| 2021/0385867 | A1* | 12/2021 | Futaki ............... H04W 74/0833 |
| 2022/0053558 | A1* | 2/2022 | Zhao .................. H04W 74/004 |
| 2022/0053568 | A1* | 2/2022 | Xing .................... H04W 52/54 |
| 2022/0159598 | A1* | 5/2022 | Kim ................. H04W 72/0446 |
| 2023/0284264 | A1* | 9/2023 | Kim ...................... H04W 80/02 370/329 |
| 2025/0220728 | A1* | 7/2025 | Lei .................... H04W 74/0833 |

FOREIGN PATENT DOCUMENTS

| | | | |
|---|---|---|---|
| WO | 2018/175809 | A1 | 9/2018 |
| WO | 2019/031797 | A1 | 2/2019 |

OTHER PUBLICATIONS

"Revised work item proposal: 2-step RACH for NR", 3GPP TSG RAN Meeting #83, RP-190711, Agenda: 9.4.7, ZTE Corporation, Mar. 18-21, 2019, 4 pages.
"Stage-2 running CR for 2-step RACH", 3GPP TSG-RAN WG2 Meeting #107-Bis, R2-1913291, Nokia, Oct. 14-18, 2019, pp. 1-8.
"Stage 3 issues on contention resolution for 2-step RACH", 3GPP TSG-RAN WG2 Meeting #107-Bis, R2-1912087, Agenda 6.13.5, OPPO, Oct. 14-18, 2019, pp. 1-2.

"IEEE 802.11", Wikipedia, Retrieved on Apr. 15, 2022, Webpage available at : https://en.wikipedia.org/wiki/IEEE_802.11.
International Search Report and Written Opinion received for corresponding Patent Cooperation Treaty Application No. PCT/CN2019/116412, dated Jul. 29, 2020, 9 pages.
"Further considerations of random access in NR", 3GPP TSG-RAN WG2 97 meeting, R2-1701721, Agenda 10.2.1.4, Intel Corporation, Feb. 13-17, 2017, pp. 1-4.
Office action received for corresponding Chinese Patent Application No. 201980102018.3, dated Apr. 12, 2024, 11 pages of office action and 8 pages of office action translation available.
"Discussion on 2-step RACH procedure", 3GPP TSG RAN WG1 #98bis, R1-1910199, Agenda 7.2.1.2, vivo, Oct. 14-20, 2019, 8 pages.
"Msg2 payload contents for 2-step RACH", 3GPP TSG-RAN WG2 Meeting#104, R2-1817064, Agenda 11.2.1.1, ZTE Corporation, Nov. 12-16, 2018, 9 pages.
Notification of Third Office Action dated Dec. 27, 2024 corresponding to Chinese Patent Application No. 2019801020183, with English translation thereof.
Rejection Decision dated Mar. 12, 2025 corresponding to Chinese Patent Application No. 201980102018.3, with English translation thereof.
ETRI, "RA response for 2-step RACH," R2-1906420, 3GPP TSG-RAN WG2 Meeting #106, Reno, USA, May 13-17, 2019.
Huawei et al., "Discussion on MsgB reception," R2-1913009, 3GPP TSG-RAN WG2 #107bis, Chong Qing, China, Oct. 14-18, 2019.
Intel Corporation, "Further consideration on the Success RAR design and fallback RAR," R2-1912794, 3GPP TSG RAN WG2 #107bis, Chongqing, China, Oct. 14-18, 2019.
Chinese Office Action, with machine English translation, corresponding to CN Application No. 201980102018.3, dated Sep. 16, 2025.
Huawai et al., "Discussion on MsgB reception", 3GPP TSG-RAN WG2 #107bis, Chong Qing, China, Oct. 14-18, 2019, R2-1913009, 4 pages.
Spreadtrum Communications, "Condiderations on 2-step RACH procedure", 3GPP TSG RAN WG1 Meeting #97, Reno, USA, May 13-17, 2019, R1-1906367, 7 pages.
ZTE Corporation et al., "Msg2 payload contents for 2-step RACH", 3GPP TSG-RAN WG2 Meeting #104, Spokane, USA, Nov. 12-16, 2018, R2-1817064, 9 pages.
Chinese Office Action, with machine English translation, corresponding to CN Application No. 201980102018.3, dated Jan. 26, 2026.

* cited by examiner

200

202

500

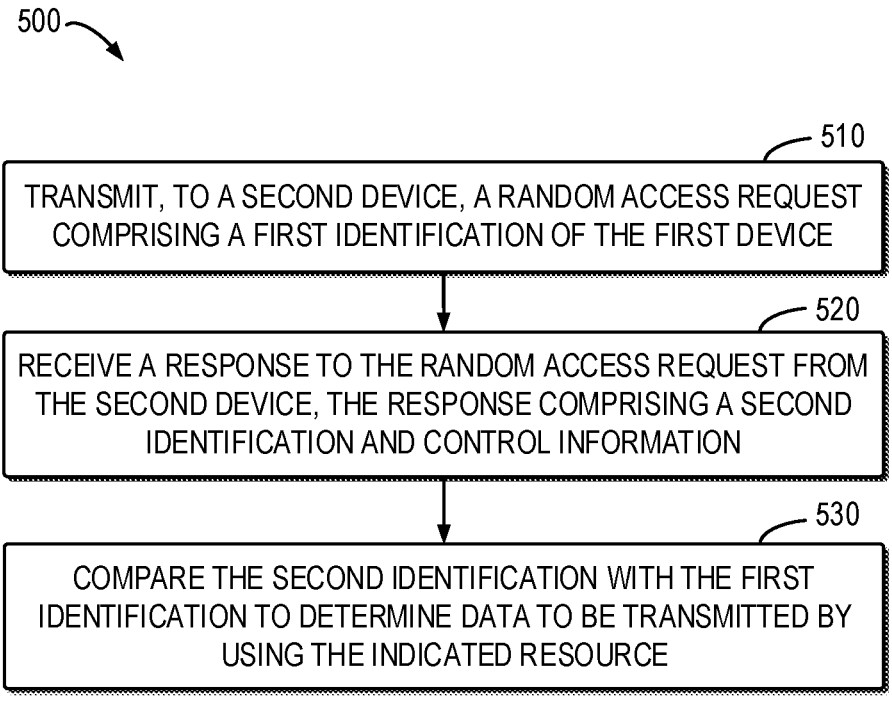

510

TRANSMIT, TO A SECOND DEVICE, A RANDOM ACCESS REQUEST
COMPRISING A FIRST IDENTIFICATION OF THE FIRST DEVICE

520

RECEIVE A RESPONSE TO THE RANDOM ACCESS REQUEST FROM
THE SECOND DEVICE, THE RESPONSE COMPRISING A SECOND
IDENTIFICATION AND CONTROL INFORMATION

530

COMPARE THE SECOND IDENTIFICATION WITH THE FIRST
IDENTIFICATION TO DETERMINE DATA TO BE TRANSMITTED BY
USING THE INDICATED RESOURCE

610
RECEIVE, FROM A FIRST DEVICE, A RANDOM ACCESS REQUEST COMPRISING A FIRST IDENTIFICATION OF THE FIRST DEVICE

620
DETERMINE A SECOND IDENTIFICATION FOR THE FIRST DEVICE BASED ON THE FIRST IDENTIFICATION

630
TRANSMIT TO THE FIRST DEVICE A RESPONSE TO THE RANDOM ACCESS REQUEST, THE RESPONSE COMPRISING THE SECOND IDENTIFICATION AND CONTROL INFORMATION

700

730

800

CONTENTION RESOLUTION IN RANDOM ACCESS PROCEDURE

RELATED APPLICATION

This application claims priority to PCT Application No. PCT/CN2019/116412, filed on Nov. 7, 2019, each of which is incorporated herein by reference in its entirety.

FIELD

Embodiments of the present disclosure generally relate to the field of telecommunication and in particular, to devices, methods and computer readable storage media for contention resolution in random access procedure.

BACKGROUND

Various wireless cellular communication systems have been implemented and are being implemented. Mobile communication systems have been developed and are being developed to meet the increasing demand for communication services. With the rapid advance of technologies, the mobile communication systems have evolved to the level capable of providing high speed data communication service beyond the early voice-oriented services.

A random access (RA) procedure refers to a procedure for a terminal device to establish or reestablish a connection with a network device such as an Evolved NodeB (eNB) or a fifth generation (5G) gNodeB (gNB). A contention based random access procedure can facilitate the possibility that multiple communication devices may be interested in attempting to access the network device through the RA procedure at the same or similar point in time.

Once access has been established and/or confirmed, the network device can assign resources to a particular terminal device in support of the uplink communication with the network device.

SUMMARY

In general, example embodiments of the present disclosure provide a solution for contention resolution in random access procedure.

In a first aspect, there is provided a first device. The first device comprises at least one processor; and at least one memory including computer program codes; the at least one memory and the computer program codes are configured to, with the at least one processor, cause the first device to transmit, to a second device, a random access request comprising a first identification of the first device; receive a response to the random access request from the second device, the response comprising a second identification from the second device for the first device and control information indicating a resource for communication between the first device and the second device; and compare the second identification with the first identification to determine data to be transmitted by using the indicated resource.

In a second aspect, there is provided a second device. The second device comprises at least one processor; and at least one memory including computer program codes; the at least one memory and the computer program codes are configured to, with the at least one processor, cause the second device to receive, from a first device, a random access request comprising a first identification of the first device; determine a second identification for the first device based on the first identification; and transmit to the first device a response to the random access request, the response comprising the second identification and control information indicating a resource for communication between the first device and the second device.

In a third aspect, there is provided a method. The method comprises: transmitting, from a first device to a second device, a random access request comprising a first identification of the first device; receiving a response to the random access request from the second device, the response comprising a second identification from the second device for the first device and control information indicating a resource for communication between the first device and the second device; and comparing the second identification with the first identification to determine data to be transmitted by using the indicated resource.

In a fourth aspect, there is provided a method. The method comprises: receiving, at a second device from a first device, a random access request comprising a first identification of the first device; determining a second identification for the first device based on the first identification; and transmitting to the first device a response to the random access request, the response comprising the second identification and control information indicating a resource for communication between the first device and the second device.

In a fifth aspect, there is provided a first device. The first device comprises means for performing: transmitting, at a first device to a second device, a random access request comprising a first identification of the first device; receiving a response to the random access request from the second device, the response comprising a second identification from the second device for the first device and control information indicating a resource for communication between the first device and the second device; and comparing the second identification with the first identification to determine data to be transmitted by using the indicated resource.

In a sixth aspect, there is provided a second device. The second device comprises means for performing: receiving, from a first device at a second device, a random access request comprising a first identification of the first device; determining a second identification for the first device based on the first identification; and transmitting to the first device a response to the random access request, the response comprising the second identification and control information indicating a resource for communication between the first device and the second device.

In a seventh aspect, there is provided a non-transitory computer readable medium comprising program instructions for causing an apparatus to perform at least the method according to the third aspect.

In an eighth aspect, there is provided a non-transitory computer readable medium comprising program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 5 illustrates a flowchart of a method according to some example embodiments of the present disclosure;

Throughout the drawings, the same or similar reference numerals represent the same or similar element.

DETAILED DESCRIPTION

Figure 1:
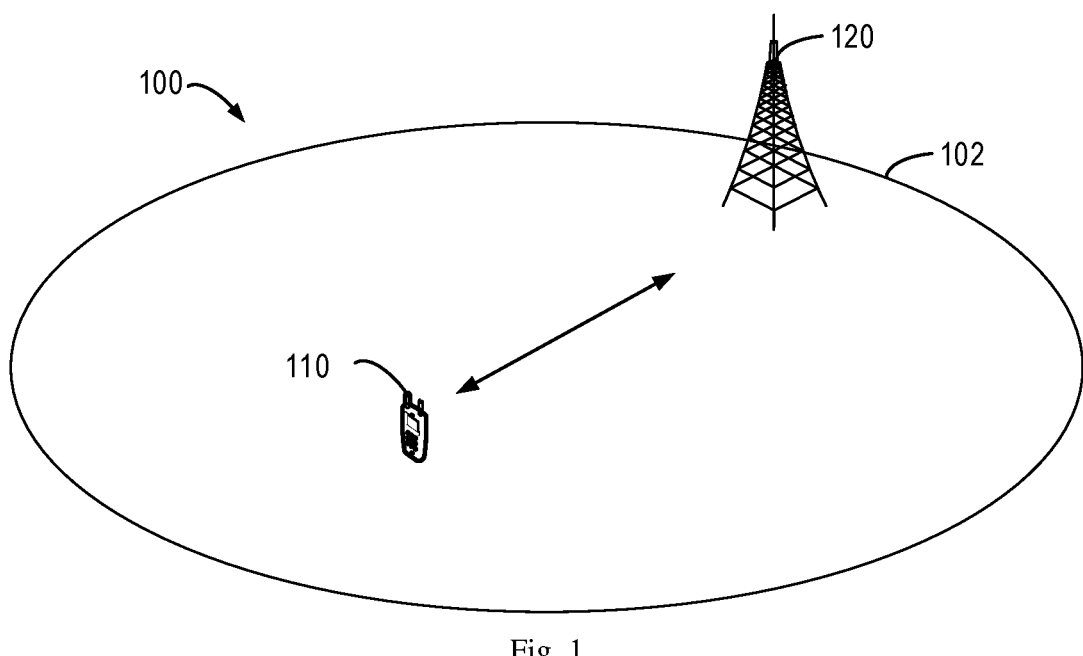
FIG. 1 illustrates an example communication system in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes"

and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), 5G New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the 5G communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, an Integrated Access Backhaul (IAB) node, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example communication system 100 in which example embodiments of the present disclosure may be implemented. The communication system 100 includes a first device 110 and a second device 120 that can communicate with each other. In this example, the first device 110 is illustrated as a terminal device (user equipment), and the second device 120 is illustrated as a network device serving the terminal device.

Thus, the serving area of the second device 120 is called as a cell 102. It is to be understood that the number of devices (both the first device and the second device) and/or cells is only for the purpose of illustration without suggesting any limitations. The system 100 may include any suitable number of devices and cells adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Cyclic Prefix Orthogonal Frequency Division Multiplexing (CP-OFDM), Discrete Fourier Transform spread OFDM (DFT-s-OFDM) and/or any other technologies currently known or to be developed in the future.

With development of communication technologies, a new generation of technology such as the 5G New Radio (NR) supports new communication scenarios including Carrier Aggregation (CA), Dual Connectivity (DC), stand-alone (SA) NR-Unlicensed (NR-U) and stand-alone NR.

In the communication system 100, upon a connection is established, the first device 110 and the second device 120 can communicate data and control information to each other. In the case where the first device 110 is a terminal device and the second device 120 is a network device, a link from the second device 120 to the first device 110 is referred to as a downlink (DL), while a link from the first device 110 to the second device 120 is referred to as an uplink (UL).

Typically, in order to communicate with each other, for example, the first device 110 may initiate a RA procedure to establish or re-establish a connection with the second device 120. The RA procedure may be triggered by a number of events, for example but not limited to, initial access, Radio Resource Control (RRC) connection re-establishment, beam failure recovery, UL data arrival, Scheduling Request (SR) failure, etc.

Currently, three types of RA procedures are supported, including a 4-step contention-based random access (CBRA) procedure, a 2-step CBRA procedure and a contention-free random access (CFRA) procedure. The RA procedures, such as the 4-step CBRA and the 2-step CBRA, may be based on contention among multiple terminal devices. The terminal device selects the type of random access procedure based on the network configuration. For example, a Reference Signal Receiving Power (RSRP) threshold may be configured for the terminal device to select between the 2-step CBRA and the 4-step CBRA at initiation of the random access procedure.

In a 4-step CBRA procedure (not shown), a terminal device selects and transmits a random access preamble RAP (which may be referred to as "MSG1") to a network device. The network device then transmits a random access response RAR (which may be referred to as "MSG2") to the random access preamble. Upon receipt of the random access response, the terminal device transmits scheduled transmission (which may be referred to as "MSG3") to the network device. The network device transmits, depending on contention across terminal devices which it serves, a contention resolution (which may be referred to as "MSG4") to the terminal device.

It has been agreed to employ a 2-step CBRA procedure. An example of the 2-step CBRA procedure is briefly introduced below with reference to FIG. 2A. In a RA procedure 200 of FIG. 2A, a terminal device transmits 210 a first message (which may be referred to as "MSGA") to a network device. The first message combines a random access preamble (similar as "MSG1") and uplink data (similar as "MSG3"). For example, MSGA includes a random access preamble on physical random access channel (PRACH) and a payload on physical uplink shared channel (PUSCH). After MSGA transmission, the terminal device starts to monitor for a response from the network device within a configured window.

Figure 2A:
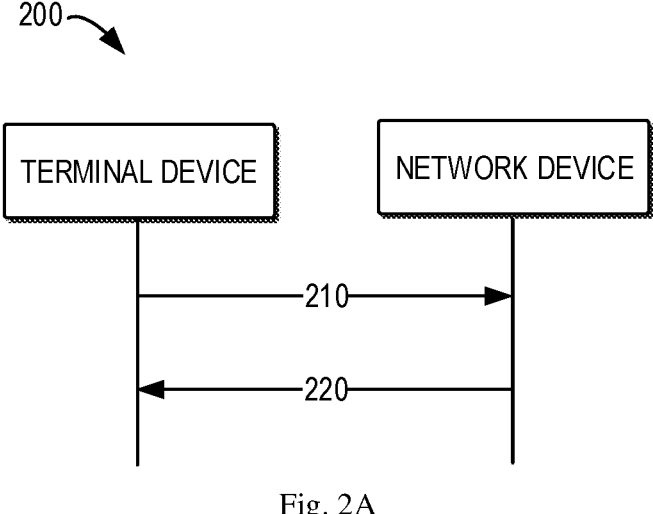
FIG. 2A illustrate an example flowchart illustrating a 2-step contention-based random access procedure.

Depending on contention across its serving terminal devices, the network device may transmit 220 a second message (which may be referred to as "MSGB") to the terminal device. The second message may combine a random access response (similar as "MSG2") and a contention resolution (similar as "MSG4"). If contention resolution is successful upon receiving the MSGB, the terminal device ends the random access procedure as shown in FIG. 2A.

In general, MSGB may include response(s) for contention resolution, fallback indication(s), and backoff indication. In some cases, contention resolution may not be included in the MSGB, for example in the case of fallback from 2-step CBRA to MSG3 transmission (4-step CBRA).

Figure 2B:
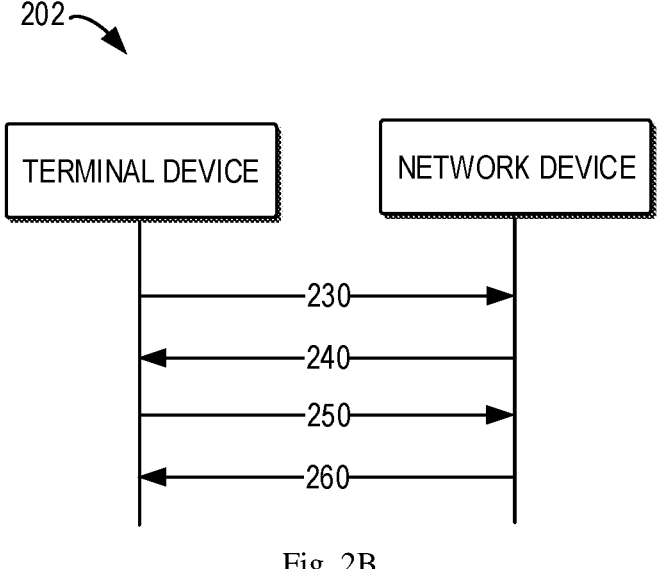
FIG. 2B illustrate an example flowchart illustrating fall-back from 2-step contention-based random access to 4-step contention-based random access.

An example procedure of fallback from 2-step CBRA to 4-step CBRA is shown in FIG. 2B. In the example procedure 202 of FIG. 2B, a terminal device transmits 230 to a network device MSGA, which may include a random access preamble on PRACH and a payload on PUSCH. The network device may detect only the preamble part of the MSGA and transmits 240 to the terminal device MGSB, which in this example includes a fallback indication. Then, the terminal device falls back to the 4-step CBRA and transmits 250 MSG3 to the network device by using the UL resource indicated in the fallback indication. The network device transmits 260 MSG4 to the terminal device. If contention resolution is not successful after MSG3 (re)transmission(s), the terminal device may go back to MSGA transmission. If the 2-step CBRA is not successful after a configured number of MSGA transmissions, the terminal device may switch to the 4-step CBRA procedure.

For a terminal device in IDLE/INACTIVE mode, as can be seen from above, the network device can transmit a fallback indication to the terminal device if it is unable to decode the PUSCH part of the MSGA. With this approach, the network device indicates in MSGB the RAR similarly to 4-step procedure and gives the terminal device a Temporary Cell Radio Network Temporary Identifier (TC-RNTI), UL grant for MSG3 transmission, and a Timing Advance Command (TAC). In the following, the RAR carrying such a fallback indication may be referred to as fallback RAR.

By contrast, a terminal device in CONNECTED mode already has its Cell Radio Network Temporary Identifier (C-RNTI) and thus MSGA transmitted by such a terminal device may comprise C-RNTI of the terminal device. For example, C-RNTI medium access control (MAC) control element (CE) may be transmitted on the PUSCH as at least a part of the payload of MS GA.

Regarding the terminal device in CONNECTED mode, the following agreements have been reached. For MSGA with C-RNTI, the terminal device shall monitor the physical downlink control channel (PDCCH) addressed to C-RNTI for success response and MSGB-RNTI (which may be e.g. RA-RNTI or new RNTI) for fallback response. For contention resolution, (a) if the Protocol Data Unit (PDU) PDCCH addressed to the C-RNTI (i.e., C-RNTI included in MSGA) containing the TAC MAC CE of 12 bits is received, the terminal device should consider the contention resolution to be successful and stop the reception of MSGB or with UL grant if the terminal device is synchronized with the network device already; (b) if the corresponding fallback RAR is detected (PDCCH addressed to the MSGB-RNTI), the terminal device should stop the monitoring of PDCCH addressed to the corresponding C-RNTI for success response and perform the fallback operation accordingly; (c) if neither corresponding fallback RAR nor PDCCH addressed C-RNTI is detected within the configured response window, the terminal device should consider the MSGA attempt failed and perform back off operation based on the backoff indicator if received in MSGB. Moreover, for MSGA with C-RNTI or common control channel (CCCH) service data unit (SDU), upon receiving the fallback RAR corresponding to the random access preamble transmitted by the terminal device, the terminal device may stop monitoring PDCCH addressed to MSGB-RNTI.

In view of the above agreements, if the network device did not receive the payload part of MSGA from the terminal device and could not decode C-RNTI MAC CE, the network device may then indicate the fallback RAR to the terminal device to retransmit the payload part of the MSGA. If the payload part of the MSGA is successfully decoded, PDCCH addressed to C-RNTI is used for contention resolution and whether the PDCCH comprises DL assignment scheduling 12-bit TAC or for UL grant depends on whether the terminal device is in or out of synchronization on uplink, respectively. In other words, if the terminal device is out of synchronization on uplink, the PDCCH addressed to C-RNTI comprises DL assignment for scheduling TAC; if the terminal device is in synchronization on uplink, the PDCCH addressed to C-RNTI can comprise UL grant or the DL assignment for scheduling TAC.

For the case when a terminal device in CONNECTED mode is out of synchronization on uplink, the contention is resolved (as according to the above agreements) based on the 12-bit TAC MAC CE received in DL. If the random access procedure is triggered by UL data arrival, the terminal device will need to wait until UL grant allocated by the network device is indicated to the terminal device.

Several solutions have been proposed to address the above scenario. In a solution, it is proposed that the network device can give the UL grant in separate downlink control information (DCI) after it has sent the DL message with 12-bit TAC MAC CE. However, this solution may waste PDCCH capacity unnecessarily.

Another solution is to specify another UL grant MAC CE which could be sent to the terminal device along with the 12-bit TAC MAC CE. This solution will waste Logical channel ID (LCID) space just for the purpose of UL grant indication for the terminal device in CONNECTED mode but out of synchronization on uplink.

Therefore, it is desirable to have a solution which enables the terminal device to determine, based a response from the network device, whether the contention is resolved, UL grant for new transmission or retransmission and optionally the timing information, without the need to wait for separate information on UL grant. Inventors of the present disclosure realize that the format of the fallback RAR mentioned above comprises fields for a TC-RNTI, UL grant for MSG3 transmission and a TAC. The inventors further realize that similar format may be used, particularly for the terminal device in CONNECTED mode but out of synchronization on uplink. However, similarly it could also be used for the terminal device in CONNECTED mode but in synchronization on uplink.

According to some example embodiments of the present disclosure, there is proposed a solution for contention resolution in RA procedure. The solution is related to the RA procedure where a random access preamble and data on a shared channel are transmitted together in a RA message, such as MSGA. One example of such RA procedure is a 2-step CBRA procedure. It would be appreciated that any other suitable RA procedures may also be applicable, for instance, a 2-step CFRA procedure.

According to the solution, a first device (for example, a terminal device) transmits a random access request to a second device (for example, a network device. In addition to a RAP, the random access request comprises a first identification of the first device, such as C-RNTI of the first device. The first device receives from the second device a response to the random access request. The received response comprises a second identification determined by the second device and control information indicating a resource for communication between the first device and the second device, such as UL grant. The first device compares the second identification with the first identification. By comparing the second identification with the first identification, the first device may determine whether random access procedure is successful and further determine data to be transmitted by using the indicated resource. In this way, information regarding contention resolution, resource grant and optionally timing advance can be indicated to the device initiating the random access procedure concurrently rather than separately. This solution is advantageous, for example, for the case where the terminal device in CONNECTED mode is out of synchronization with the network device on uplink, since the terminal device does not need to wait for a separate UL grant.

Figure 3:
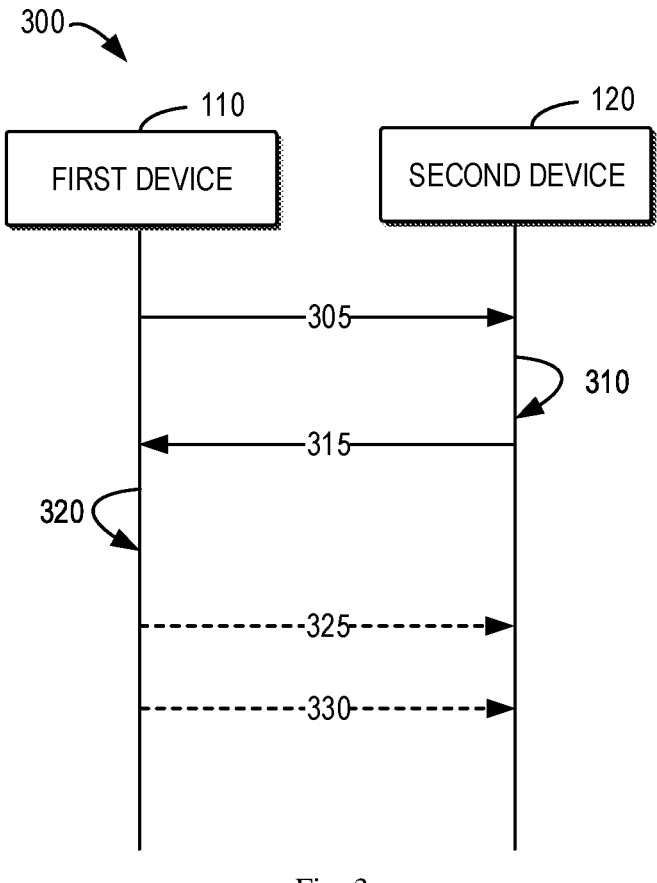
FIG. 3 illustrates a flowchart illustrating a process for contention resolution in random access procedure according to some example embodiments of the present disclosure.

Some example embodiments of the present disclosure will be described in detail below with reference to the accompanying drawings. Reference is now made to FIG. 3, which shows a process 300 for contention resolution in RA procedure according to some example embodiments of the present disclosure. For the purpose of discussion, the process 300 will be described with reference to FIG. 1. The process 300 may involve the first device 110 and the second device 120 as illustrated in FIG. 1.

In the process 300, the first device 110 transmits 305 a random access request to the second device 120. The random access request comprises an identification (which is also referred to as a first identification) of the first device 110. The random access request also comprises a RAP. This random access procedure may be the 2-step CBRA procedure described above and the random access request may be the first message, i.e. MSGA. For example, in the case where the first device 110 is a terminal device and the second device 120 is a network device, the RAP is transmitted on PRACH and the identification of the first device 110 is transmitted on PUSCH as at least a part of uplink payload.

In some example embodiments, the identification of the first device 110 included in the random access request may be C-RNTI of the first device 110, for example in the case where the first device 110 is in a connected state with the second device 120. In this case, the C-RNTI of the first device 110 may be transmitted on a shared channel by way of C-RNTI MAC CE for example. In some example embodiments, the first device 110 may be a terminal device in CONNECTED mode.

Once the random access request is transmitted 305, the first device 110 may start to monitor a response to the random access request within a monitoring window. In the case where the first device 110 is a terminal device and the second device 120 is a network device 120, the first device 110 may monitor PDCCH addressed to the first identification (for example, C-RNTI) and PDCCH addressed to MSGB-RNTI (e.g. RA-RNTI or a new type of RNTI) as mentioned above.

After receiving the random access request from the first device 110, the second device 120 may determine 310 a second identification for the first device 110 based on the first identification, for example based on the reception of the first identification. The second identification may or may not correspond to the first identification based on the reception of the first identification. As used herein, by using the term "correspond to" in expression such as "a second identification corresponds to a first identification", it means that the second identification is identical to, or equivalent to, or otherwise correlated to the first identification. For example, the second identification may be uniquely derived from the first identification.

In some example embodiments, the second identification may correspond to the first identification. In case that the first identification is received successfully, the second identification may be determined to correspond to the first identification. For example, if both the RAP on PRACH and the C-RNTI MAC CE on PUSCH are decoded successfully, the second device 120 may determine the second identification to correspond to C-RNTI of the first device 110. As an example, the second identification may be determined to be identical to C-RNTI of the first device 110. As another example, the second identification may be determined to be an identification which can be derived from the C-RNTI of the first device 110 uniquely.

In some example embodiments, the second identification may not correspond to the first identification. In case that the receiving of the first identification is failed, the second identification may be determined to be a temporary cell radio network temporary identification which has not been assigned to a device in a serving cell of the first device 110, for example has not been assigned to any device in the cell 102 as shown in FIG. 1. For example, if the RAP on PRACH is received successfully but decoding of the C-RNTI MAC CE on PUSCH is failed, the second device 120 is unable to recognize the identity of the device transmitting the RAP. As such, the second device 120 may determine as the second identification a TC-RNTI which has not been assigned to any device in the cell 102.

As used herein, the term "in case" is intended to cover the meanings provided by the terms "if", "in accordance with", "in response to" and the like.

The second device 120 transmits 315 to the first device 110 a response to the random access request. The response comprises the second identification and control information indicating a resource for communication between the first device 110 and the second device 120. In the case where the first device 110 is a terminal device and the second device 120 is a network device, the control information may be UL grant to the first device 110 for performing subsequent transmission (e.g., new transmission or retransmission).

In addition to the second identification and the control information indicating the resource (which may be referred to as resource grant below), the response may comprise other information. In some example embodiments, the response may comprise timing information, which is used for timing alignment on a link between the first device 110 and the second device 120. For example, the timing information may be the 12-bit TAC indicating the absolute value for timing adjustment.

In some example embodiments, the response including the timing information may be generated by the second device 120 regardless of the synchronization state between the first device 110 and the second device 120.

In some example embodiments, the response including the timing information may be generated by the second device 120 based on whether the first device 110 is synchronized with the second device 120. The second device 120 may determine whether the first device 110 is out of synchronization with the second device 120, for example based on whether a timer for the first device 110 is expired or not. If it is determined that the first device 110 is out of synchronization with the second device 120, the second device 120 may determine the timing information for the first device 110 and include the timing information in the response.

In the case where the first device 110 is out of synchronization with the second device 120 and the random access procedure is triggered by data arrival or beam failure recovery at the first device 110, both the resource grant and timing information is needed for the first device 110 to perform subsequent transmission. It will be beneficial to provide the resource grant (e.g., UL grant) and the timing information (e.g., TAC) to the first device 110 concurrently, rather than separately.

Therefore, the response generated by the second device 120 may comprise an identification field for the second identification, a grant field for the resource grant (e.g. for UL grant) and a timing field for the timing information (e.g. for TAC). As mentioned above, the format of the conventional fallback RAR comprises a field for a TC-RNTI, a field for UL grant for MSG3 transmission and a field for TAC.

In some example embodiments, a format same as or similar with the conventional fallback RAR can be used for the response generated by the second device 120. For example, the field for TC-RNTI can be used to carry the second identification, the field for UL grant can be used to carry the control information indicating the resource and the field for TAC can be used to carry the timing formation for the first device 110. It is to be understood that even if the timing information is not needed by the first device 110 (for example, the first device 110 is in synchronization with the second device 120), the format same as or similar with the conventional fallback RAR can also be used for the response generated by the second device 120.

In this way, the second device 120 is allowed to provide resource grant for new transmission along with timing information to the first device 110, which is in a connected state with the second device 120 but is out of synchronization with the second device 120. In particular, for the case where the first device 110 is a terminal device and the second device 120 is a network device, the network device can provide UL grant for new transmission along with TAC to the terminal device in CONNECTED mode but out of synchronization during 2-step random access. As such, the proposed solution does not require separate DCI for DL to provide TAC and for providing UL grant. Moreover, in the example embodiments where the format of the conventional fallback RAR is used, specification of any new MAC CEs for UL grant can be avoided.

Still referring to FIG. 3, after receiving the response to the random access request, the first device 110 compares 320 the second identification with the first identification. By comparing the second identification with the first identification, the first device 110 can determine whether the random access procedure (for example, 2-step CBRA) is successful. In other words, the first device 110 can determine whether the received response is intended for contention resolution or for fallback. The first device 110 may further determine data to be transmitted by using the indicated resource.

The first device 110 may check the identification field as mentioned above within the response to determine whether the second identification corresponds to the first identification. For the above mentioned example where the format same as or similar with the conventional fallback RAR is used, the first device 110 may check whether the value of the TC-RNTI field corresponds to (for example, identical to) C-RNTI of the first device 110 or not.

If the comparison results that the second identification corresponds to the first identification, the first device 110 may determine that the received response is intended for successful contention resolution, or in other words, the random access procedure is successful. As such, the resource indicated in the response should be used for new transmission rather than retransmission of the payload part of MSGA for example.

The first device 110 may determine that the RA procedure is successful. The first device 110 may determine that further data rather than data comprised in the random access request (for example, pending/new data rather than the data already in the buffer for MS GA) is to be transmitted and transmit 325 the further data to the second device 120 by using the indicated resource. That is, by using the indicated resource, the first device 110 may perform new transmission with new data (user plane data, control plane data, or MAC control elements, or padding) rather than retransmission of payload of MSGA.

Considering an example where the received response is in a format same as or similar with the conventional fallback RAR, if the TC-RNTI field corresponds to C-RNTI of the first device 110, the received response can be considered as successful contention resolution. As such, the RA procedure can be completed, the buffer for MSGA can be flushed and the indicated resource (e.g., indicated by UL grant) can be used for new transmission. In the case where the first device 110 is a terminal device and the second device 120 is a network device, if the RA procedure is triggered by UL data arrival (or beam failure recovery or by any other means initiated by a terminal device), the indicated resource can be used to transmit pending data to the second device 120.

If the comparison results that the second identification does not correspond to the first identification, the first device 110 may determine that the received response is intended for fallback, or in other words, the random access procedure is currently not completed. As such, the resource indicated in the response should be used for retransmission of at least the first identification, for example retransmission of the payload part of MSGA.

The first device 110 may determine that at least the first identification is to be transmitted and retransmit 330 at least the first identification to the second device 120 by using the indicated resource. After retransmission of at least the first identification, the first device 110 may monitor further response from the second device 120 for contention resolution. In other words, the first device 110 may perform fallback operation. If the payload of MSGA includes data other than the first identification, such data can also be retransmitted 330 to the second device 120 by using the indicated resource. For example, the first device 110 may fetch the data stored in the buffer for MSGA and transmit the fetched data by using the indicated resource.

Still considering the above example where the received response is in the format similar as the conventional fallback RAR, if the TC-RNTI field does not correspond to C-RNTI of the first device 110, the received response can be considered as a fallback indication. As such, the RA procedure may be switched to the 4-step CBRA for example. In the case where the first device 110 is a terminal device and the second device 120 is a network device, the first device 110 may perform the fallback operation and perform retransmission of the payload part of MSGA by using the resource as indicated by UL grant.

Figure 4:
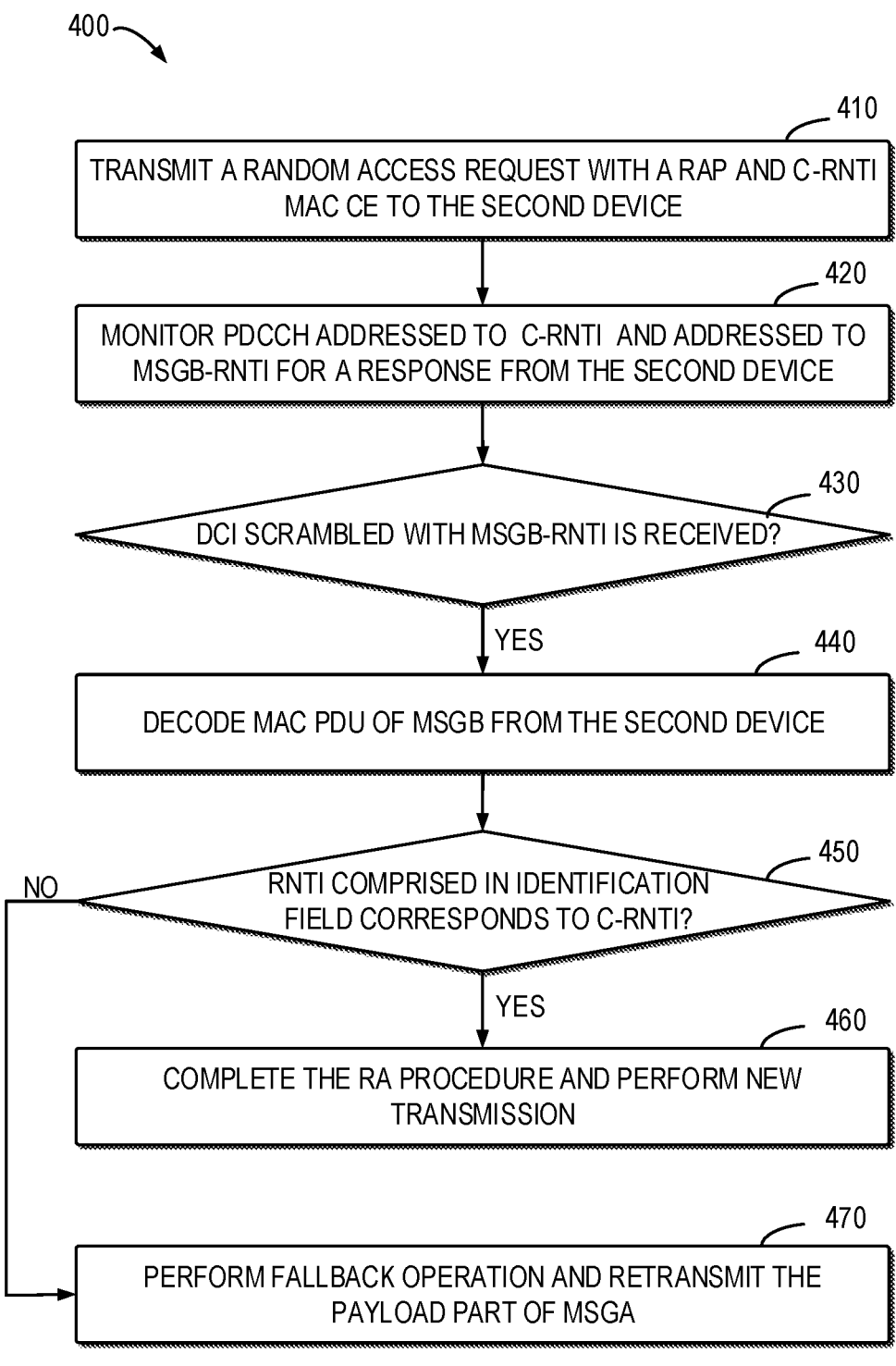
FIG. 4 illustrates a flowchart illustrating an example process implemented at a first device according to some example embodiments of the present disclosure.

To better understand the solution proposed herein, an example process is now described. Reference now is made to FIG. 4, which illustrates a flowchart illustrating an example process 400 implemented at the first device 110 according to some example embodiments of the present disclosure. The example process 400 can be considered as a specific implementation of the process 300 at the first device 110 as shown in FIG. 1 and will be described with reference to FIG. 1. For purpose of illustration without any limitation, the example process 400 is described with respect to the case where the first device 110 is a terminal device and the second device 120 is a network device. It is to be understood that the process 400 may include acts or blocks which are not described.

At block 410, the first device 110 transmits a random access request (for example, MSGA in a 2-step CBRA) with a RAP and C-RNTI MAC CE to the second device 120. The RAP may be transmitted on PRACH and the C-RNTI MAC CE including C-RNTI of the first device 110 may be transmitted on PUSCH.

At block 420, the first device 110 monitors PDCCH addressed to the C-RNTI of the first device 110 and addressed to MSGB-RNTI for a response from the second device 120. The MSGB-RNTI may be for example RA-RNTI or new type of RNTI.

At block 430, the first device 110 determines whether DCI scrambled with MSGB-RNTI is received. For example, if PDCCH addressed to MSGB-RNTI is monitored by the first device 110, the first device 110 may decode the DCI carried by the PDCCH. If the DCI scrambled with MSGB-RNTI is received, then the process 500 proceeds to the block 440.

At block 440, the first device 110 decodes MAC PDU of MSGB from the second device 120. For example, the first device 110 may receive and decode the MAC PDU on PDSCH as indicated by the DCI received at block 430. The MAC PDU may include a response corresponding to the RAP transmitted at the block 410. For example, a subheader of the MAC PDU may include an identification of the RAP transmitted at block 410 (such as, RAPID) to identify which random access procedure the response corresponds to.

The response may be a conventional fallback RAR or a response as proposed herein. The MAC PDU comprises an identification field as mentioned above, similar with the TC-RNTI field in the conventional fallback RAR. The MAC PDU may further comprise fields for UL grant and TAC, for example the grant field and timing field as mentioned above. The field for UL grant may comprise the UL grant provided for subsequent transmission (new transmission or retransmission) and the field for TAC may comprise the TAC for synchronization with the second device 120 on uplink.

At block 450, the first device 110 determines whether RNTI comprised in the identification field corresponds to the C-RNTI of the first device 110. For example, the first device 110 may determine whether the RNTI comprised in the identification field is identical to the C-RNTI of the first device 110 or otherwise correlated to the C-RNTI of the first device 110, as described above.

If the first device 110 determines that the RNTI comprised in the identification field corresponds to the C-RNTI, the process 500 proceeds to block 460. At block 460, the first device 110 completes the RA procedure and performs new transmission according to the provided UL grant. For example, the first device 110 may consider that contention resolution is successful and thus flush the buffer for MSGA.

If the first device 110 at block 450 determines that the RNTI comprised in the identification field does not corresponds to the C-RNTI, the example process 500 proceeds to block 470. At block 470, the first device 110 performs fallback operation and retransmits the payload part of MSGA according to the provided UL grant. For example, the first device 110 at least retransmits C-RNTI MAC CE to the second device 120 by using the resource indicated by the provided UL grant. In this case, the first device 110 may consider the response received at block 440 as the conventional fallback RAR and the random access procedure falls back from the 2-step CBRA to the 4-step CBRA.

More details of the example embodiments in accordance with the present disclosure will be described with reference to FIGS. 5-6.

FIG. 5 shows a flowchart of an example method 500 according to some example embodiments of the present disclosure. The method 500 can be implemented at the first device 110 as shown in FIG. 1. For the purpose of discussion, the method 500 will be described with reference to FIG. 1.

At block 510, the first device 110 transmits, to a second device 120, a random access request comprising a first identification of the first device 110. At block 520, the first device 110 receives a response to the random access request from the second device 120. The response comprises a second identification from the second device 120 for the first device 110 and control information indicating a resource for communication between the first device 110 and the second device 120. At block 530, the first device 110 compares the second identification with the first identification to determine data to be transmitted by using the indicated resource.

In some example embodiments, the method 500 further comprises: in case the comparison results that the second identification corresponds to the first identification, determining that further data rather than data comprised in the random access request is to be transmitted; and transmitting the further data to the second device 120 by using the indicated resource.

In some example embodiments, the method 500 further comprising: determining that a random access procedure corresponding to the random access request is successful.

In some example embodiments, the method 500 further comprising: in case the comparison results that the second identification does not correspond to the first identification, determining that the first identification is to be transmitted; and retransmitting the first identification to the second device 120 by using the indicated resource.

In some example embodiments, the first device 110 is out of synchronization with the second device, and the received response comprises timing information, the timing information used for timing alignment with the second device 120 on a link between the first device 110 and the second device 120.

In some example embodiments, the first identification comprises a cell radio network temporary identifier of the first device 110.

In some example embodiments, the first device 110 is in a connected state with the second device 120.

In some example embodiments, the first device 110 comprises a terminal device, and the second device 120 comprises a network device.

Figure 6:
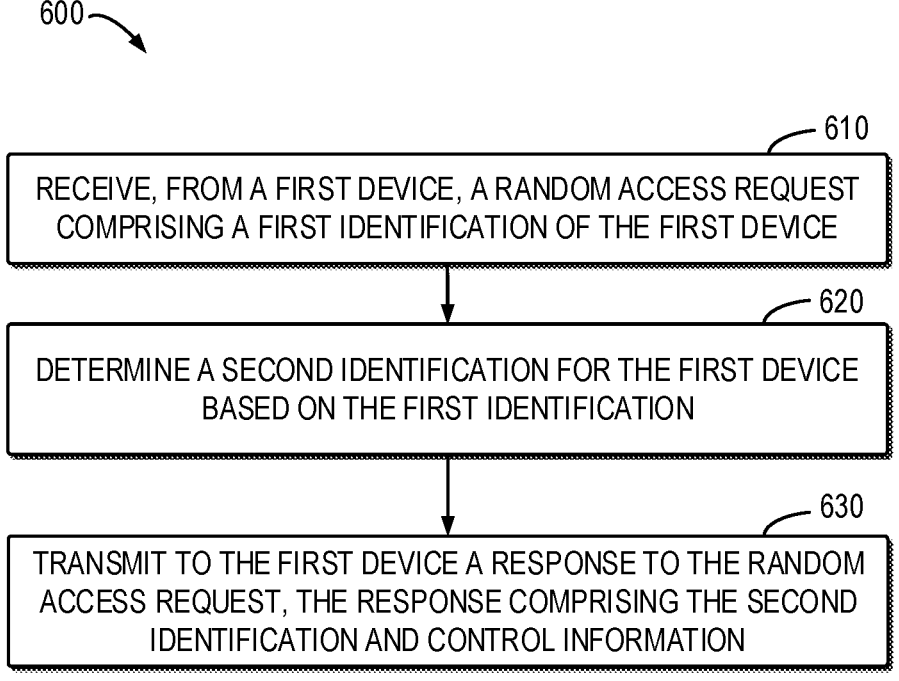
FIG. 6 illustrates a flowchart of a method according to some example embodiments of the present disclosure.

FIG. 6 shows a flowchart of an example method 600 according to some example embodiments of the present disclosure. The method 600 can be implemented at the second device 120 as shown in FIG. 1. For the purpose of discussion, the method 600 will be described with reference to FIG. 1.

At block 610, the second device 120 receives, from a first device 110, a random access request comprising a first identification of the first device 110. At block 620, the second device 120 determines a second identification for the first device 110 based on the first identification. At block 630, the second device 120 transmits to the first device 110 a response to the random access request, the response comprising the second identification and control information indicating a resource for communication between the first device 110 and the second device 120.

In some example embodiments, determining the second identification comprises: in case that the first identification is received successfully, determining the second identification to correspond to the first identification.

In some example embodiments, the method 600 further comprises: receiving, from the first device 110, further data rather than data comprised in the random access request carried on the indicated resource.

In some example embodiments, determining the second identification comprises: in case that the receiving of the first identification is failed, determining the second identification to be a temporary cell identification which has not been assigned to a device in a serving cell of the first device 110.

In some example embodiments, the method 600 further comprises: receiving, from the first device 110, at least one retransmission of the first identification carried on the indicated resource.

In some example embodiments, the method 600 further comprises: determining whether the first device 110 is out of synchronization with the second device 120; in case it is determined that the first device 110 is out of synchronization with the second device 120, determining timing information for the first device 110, the timing information used for timing alignment on a link between the first device 110 and the second device 120; and including the timing information in the response.

In some example embodiments, the first identification comprises a cell radio network temporary identifier of the first device 110.

In some example embodiments, the first device 110 is in a connected state with the second device 120.

In some example embodiments, the first device 110 comprises a terminal device, and the second device 120 comprises a network device.

In some example embodiments, a first device capable of performing the method 500 may comprise means for performing the respective steps of the method 500. The means may be implemented in any suitable form. For example, the means may be implemented in a circuitry or software module.

In some example embodiments, the first device comprises means for performing: transmitting, to a second device, a random access request comprising a first identification of the first device; receiving a response to the random access request from the second device, the response comprising a second identification from the second device for the first device and control information indicating a resource for communication between the first device and the second device; and comparing the second identification with the first identification to determine data to be transmitted by using the indicated resource.

In some example embodiments, the first device further comprises means for performing: in case the comparison results that the second identification corresponds to the first identification, determining that further data rather than data comprised in the random access request is to be transmitted; and transmitting the further data to the second device by using the indicated resource.

In some example embodiments, the first device further comprises means for performing: determining that a random access procedure corresponding to the random access request is successful.

In some example embodiments, the first device further comprises means for performing: in case the comparison results that the second identification does not correspond to the first identification, determining that the first identification is to be transmitted; and retransmitting the first identification to the second device by using the indicated resource.

In some example embodiments, the first device is out of synchronization with the second device, and the received response comprises timing information, the timing information used for timing alignment with the second device on a link between the first device and the second device.

In some example embodiments, the first identification comprises a cell radio network temporary identifier of the first device.

In some example embodiments, the first device is in a connected state with the second device.

In some example embodiments, the first device comprises a terminal device, and the second device comprises a network device.

In some example embodiments, a second device capable of performing the method 600 may comprise means for performing the respective steps of the method 600. The means may be implemented in any suitable form. For example, the means may be implemented in a circuitry or software module.

In some example embodiments, the second device comprises means for performing: receiving, from a first device, a random access request comprising a first identification of the first device; determining a second identification for the first device based on the first identification; and transmitting to the first device a response to the random access request, the response comprising the second identification and control information indicating a resource for communication between the first device and the second device.

In some example embodiments, the means for performing determining the second identification comprises means for performing: in case that the first identification is received successfully, determining the second identification to correspond to the first identification.

In some example embodiments, the second device further comprises means for performing: receiving, from the first device, further data rather than data comprised in the random access request carried on the indicated resource.

In some example embodiments, the means for performing determining the second identification comprises means for performing: in case that the receiving of the first identification is failed, determining the second identification to be a temporary cell identification which has not been assigned to a device in a serving cell of the first device.

In some example embodiments, the second device further comprises means for performing: receiving, from the first device, at least one retransmission of the first identification carried on the indicated resource.

In some example embodiments, the second device further comprises means for performing: determining whether the first device is out of synchronization with the second device; in case it is determined that the first device is out of synchronization with the second device, determining timing information for the first device, the timing information used for timing alignment on a link between the first device and the second device; and including the timing information in the response.

In some example embodiments, the first identification comprises a cell radio network temporary identifier of the first device.

In some example embodiments, the first device is in a connected state with the second device.

In some example embodiments, the first device comprises a terminal device, and the second device comprises a network device.

Figures 7, 8:
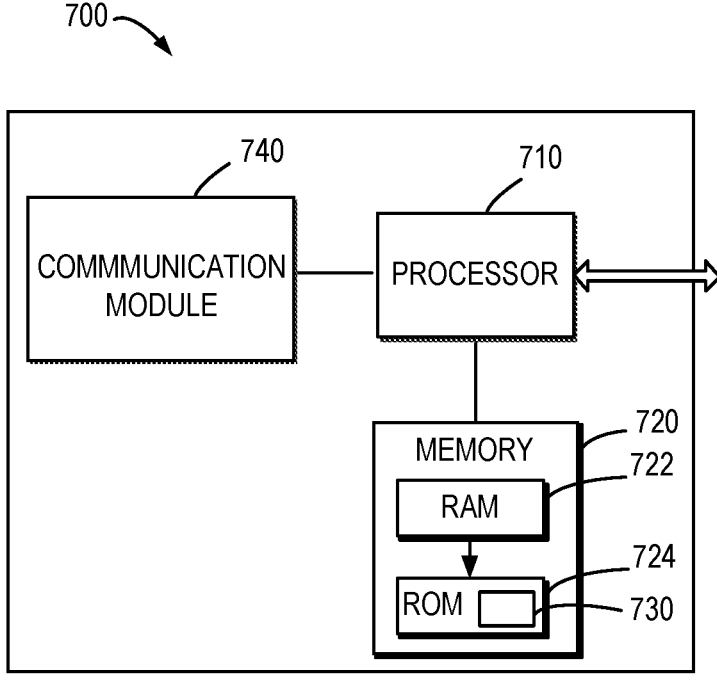
FIG. 7 illustrates a simplified block diagram of a device that is suitable for implementing embodiments of the present disclosure.
FIG. 8 illustrates a block diagram of an example computer readable medium in accordance with some embodiments of the present disclosure.

FIG. 7 is a simplified block diagram of a device 700 that is suitable for implementing embodiments of the present disclosure. The device 700 may be provided to implement the communication device, for example the first device 110 or the second device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 5 to 6. The embodiments of the present disclosure may also be implemented by hardware or by a combination of software and hardware.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes
    are configured to, with the at least one processor, cause
    the first device at least to:
        transmit, to a second device, a random access request
           comprising a first identification of the first device;
        receive a response to the random access request from
           the second device, wherein the response comprises a
           second identification from the second device for the
           first device and control information indicating a
           resource for communication between the first device
           and the second device, and wherein the response is
           a fallback random access response, wherein the first
           device is out of synchronization with the second
           device, and the response comprises timing informa-
           tion comprising a timing advance command indicat-
           ing an absolute value for timing adjustment, the
           timing information used for timing alignment with
           the second device on a link between the first device
           and the second device;
        compare the second identification with the first identi-
           fication; and
        in response to the comparison results that the second
           identification corresponds to the first identification,
           determine that further data rather than data comprised
           in the random access request is to be transmitted; and
           transmit the further data to the second device by using
           the indicated resource.

2. The first device of claim 1, wherein the at least one memory and the computer program codes are further configured to, with the at least one processor, cause the first device to:
    determine that a random access procedure corresponding
        to the random access request is successful.

3. The first device of claim 1, wherein the at least one memory and the computer program codes are further configured to, with the at least one processor, cause the first device to:
    in case the comparison results that the second identifica-
        tion does not correspond to the first identification,
        determine that the first identification is to be transmit-
        ted; and
    retransmit the first identification to the second device by
        using the indicated resource.

4. The first device of claim 1, wherein the first identification comprises a cell radio network temporary identifier of the first device.

5. The first device of claim 1, wherein the first device is in a connected state with the second device.

6. The first device of claim 1, wherein the first device comprises a terminal device and the second device comprises a network device.

7. A second device comprising:
at least one processor; and
at least one memory including computer program codes;
the at least one memory and the computer program codes
    are configured to, with the at least one processor, cause
    the second device at least to:

receive, from a first device, a random access request
           comprising a first identification of the first device;
        determine a second identification for the first device
           based on the first identification, wherein the second
           identification is determined to correspond to the first
           identification in response to the first identification
           being received successfully;
        transmit to the first device a response to the random
           access request, wherein the response comprises the
           second identification and control information indi-
           cating a resource for communication between the
           first device and the second device, wherein the
           response is a fallback random access response,
           wherein the first device is out of synchronization
           with the second device, and the response comprises
           timing information comprising a timing advance
           command indicating an absolute value for timing
           adjustment, the timing information used for timing
           alignment with the first device on a link between the
           first device and the second device; and
        receive, from the first device, further data rather than
           data comprised in the random access request carried
           on the indicated resource.

8. The second device of claim 7, wherein in case that the receiving of the first identification is failed, the second identification is determined to be a temporary cell identification which has not been assigned to a device in a serving cell of the first device.

9. The second device of claim 8, wherein the at least one memory and the computer program codes are further configured to, with the at least one processor, cause the second device at least to:
    receive, from the first device, at least one retransmission
        of the first identification carried on the indicated
        resource.

10. The second device of claim 7, wherein the at least one memory and the computer program codes are further configured to, with the at least one processor, cause the second device at least to:
    determine whether the first device is out of synchroniza-
        tion with the second device;
    in case it is determined that the first device is out of
        synchronization with the second device, determine
        timing information for the first device, the timing
        information used for timing alignment on a link
        between the first device and the second device; and
    include the timing information in the response.

11. The second device of claim 7, wherein the first identification comprises a cell radio network temporary identifier of the first device.

12. The second device of claim 7, wherein the first device is in a connected state with the second device.

13. A method comprising:
transmitting, from a first device to a second device, a
    random access request comprising a first identification
    of the first device;
receiving a response to the random access request from
    the second device, wherein the response comprises a
    second identification from the second device for the
    first device and control information indicating a
    resource for communication between the first device
    and the second device, and wherein the response is a
    fallback random access response, wherein the first
    device is out of synchronization with the second
    device, and the response comprises timing information
    comprising a timing advance command indicating an
    absolute value for timing adjustment, the timing information used for timing alignment with the second device on a link between the first device and the second device;

comparing the second identification with the first identification; and in response to the comparison results that the second identification corresponds to the first identification, determining that further data rather than data comprised in the random access request is to be transmitted; and transmitting the further data to the second device by using the indicated resource.

14. The method of claim 13, further comprising:

determining that a random access procedure corresponding to the random access request is successful.

15. The method of claim 13, further comprising:

in case the comparison results that the second identification does not correspond to the first identification, determining that the first identification is to be transmitted; and retransmitting the first identification to the second device by using the indicated resource.

16. The method of claim 13, wherein the first identification comprises a cell radio network temporary identifier of the first device.

17. The method of claim 13, wherein the first device is in a connected state with the second device.

18. The method of claim 13, wherein the first device comprises a terminal device and the second device comprises a network device.

\*     \*     \*     \*     \*